United States Patent
Shutt et al.

(10) Patent No.: US 9,164,775 B2
(45) Date of Patent: Oct. 20, 2015

(54) METHOD AND APPARATUS FOR PERFORMING AN OUT OF BAND JOB

(71) Applicants: Mark W. Shutt, Austin, TX (US); Raja Tamilarasan, Round Rock, TX (US); Sumeet Kukreja, Round Rock, TX (US); Sundar Dasar, Round Rock, TX (US); Yogesh P. Kulkarni, Round Rock, TX (US)

(72) Inventors: Mark W. Shutt, Austin, TX (US); Raja Tamilarasan, Round Rock, TX (US); Sumeet Kukreja, Round Rock, TX (US); Sundar Dasar, Round Rock, TX (US); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 13/741,065

(22) Filed: Jan. 14, 2013

(65) Prior Publication Data

US 2014/0201511 A1    Jul. 17, 2014

(51) Int. Cl.
G06F 9/44       (2006.01)
G06F 9/445      (2006.01)

(52) U.S. Cl.
CPC ........... *G06F 9/4416* (2013.01); *G06F 8/65* (2013.01)

(58) Field of Classification Search
CPC .......... G06F 9/44; G06F 9/4416; G06F 8/65
USPC ........................................................... 713/2
See application file for complete search history.

(56) References Cited

U.S. PATENT DOCUMENTS

| 7,127,603 B2 | 10/2006 | Rangarajan et al. |
| 2011/0078799 A1 * | 3/2011 | Sahita et al. ............... 726/26 |

* cited by examiner

*Primary Examiner* — Thomas Lee
*Assistant Examiner* — Danny Chan
(74) *Attorney, Agent, or Firm* — Baker Botts L.L.P.

(57) ABSTRACT

A method of performing an out of band (OOB) job at a host is disclosed. A boot option query is transmitted from the host to a service processor. It is then determined if a current boot option is an OOB job. At least one of a job type and a device type associated with the OOB job is identified if the current boot option is an OOB job. An Option ROM and a driver relating to the identified job type and the identified device type is then selectively loaded and the OOB job is performed.

20 Claims, 2 Drawing Sheets

METHOD AND APPARATUS FOR PERFORMING AN OUT OF BAND JOB

TECHNICAL FIELD

The present disclosure relates generally to computing systems and information handling systems, and, more particularly, to a system and method for optimizing out of band job execution time in a computing system or information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A data processing network may include two or more information handling systems that are coupled to one another and work in concert to process data. One or more of the information handling systems in the data processing network may be a server. A service processor may operate as the system administrator and may be used to regulate operation of the information handling systems in the data processing network. In certain applications, the service processor may schedule Out of Band ("OOB") jobs. Such OOB jobs may include, but are not limited to, configuration of system devices (e.g., Network Interface Card ("NIC"), Redundant Array of Independent Disks ("RAID"), Basic Input/Output System ("BIOS"), etc.) or firmware updates. The OOB jobs typically require a system reboot followed by launching a pre-boot system management application to perform the desired update or configuration task. For instance, the pre-boot system management application may be a UEFI based application like Lifecycle Controller available from Dell™. The OOB job is then performed and the system is rebooted again to launch back into the Operating System.

OOB jobs are usually scheduled by users or executable scripts from their remote clients sending specific requests, such as requests for configuration of a specific device or updating it's firmware, to the service processor. The information handling system that sends this request is referred to herein as the "host". Upon the receipt of such requests, the service processor then schedules a task (referred to herein as an "OOB job") which is to be executed on a different data processing network such as a server in a specific time window. The information handling system on which the OOB job is executed is referred to as the "OOB Client". Following is a description of the sequence of operations on the server data processing network from the time it reboots until it executes such OOB jobs.

FIG. 1 depicts a method of handling OOB jobs by a typical data processing network in accordance with the prior art. First, at step 102 a host (e.g., an information handling system such as a server) may transmit a boot option query to a service processor. The service processor returns the current boot options to the host at step 104. It is then determined at step 106 whether the current boot option identified by the service processor is an OOB job. If the current boot option is not an OOB job, the process proceeds to step 108 and the host boots to the Operating System.

On the other hand, if at step 106 it is determined that the current boot option identified by the service processor is an OOB job, the host prepares to execute such jobs. At step 110 the Option ROMs and Pre-boot environment drivers ("driver(s)") for all devices of the host are typically loaded, regardless of whether the device is one that is being configured and/or updated by the OOB job. The OOB job is then performed by the host at step 112 and the system reboots at step 114.

Depending on the number of devices present in the host, the time required for loading Option ROMs and drivers for all devices may be significant. With the evolution of information handling systems, it is desirable to maximize operational efficiency of the system and minimize system downtime. Accordingly, the contribution of current OOB jobs to system downtime adversely impacts overall system performance. Moreover, loading the Option ROMs and drivers for all devices renders the OOB job susceptible to unnecessary errors. For instance, if a device not participating in the requested OOB job has a corrupt Option ROM or driver it can cause an unexpected system behavior and delay job execution.

SUMMARY

In accordance with certain embodiments, a method of performing an out of band (OOB) job at a host comprises transmitting a boot option query from the host to a service processor; determining if a current boot option is an OOB job; identifying at least one of a job type and a device type associated with the OOB job if the current boot option is an OOB job; selectively loading an Option ROM and a driver relating to the identified job type and the identified device type; and performing the OOB job.

In accordance with another embodiment, a data processing network system comprises a service processor and a host. The service processor identifies an OOB job as a current boot option for the host. The host comprises a plurality of ROM options and a plurality of drivers, each of the plurality of ROM options and the plurality of drivers corresponding to a job type and a device type associated with an OOB job. The OOB client selectively loads one or more of the plurality of ROM options and the plurality of drivers depending on the OOB job identified by the service processor.

In certain embodiments, an information handling system includes a computer readable medium with machine readable instructions to transmit a boot option query from a host to a service processor; determine if a current boot option is an OOB job; identify at least one of a job type and a device type associated with the OOB job if the current boot option is an OOB job; selectively load an Option ROM and a driver relating to the identified job type and the identified device type; and perform the OOB job.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 1:
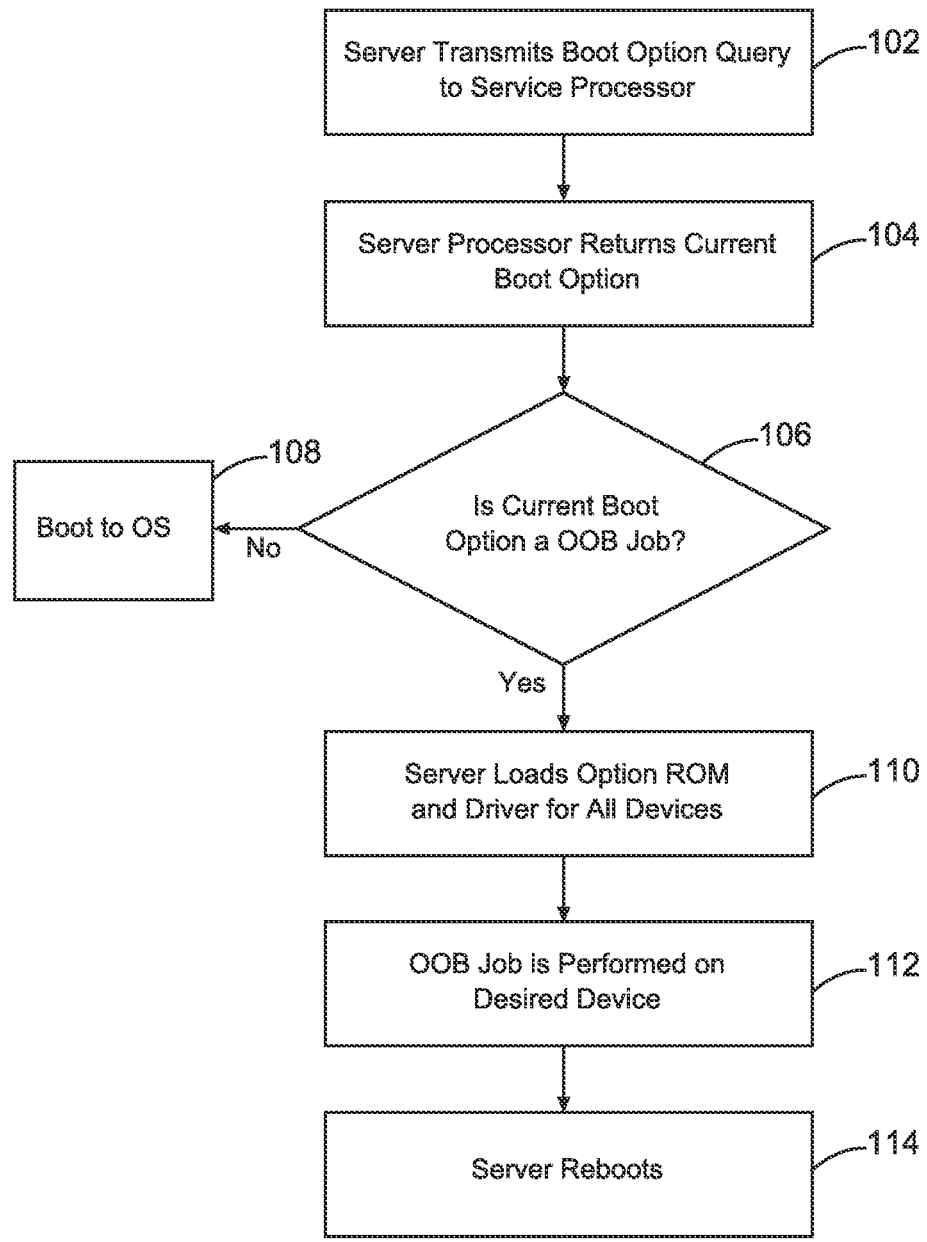
FIG. 1 depicts a process for performing an OOB job in accordance with the prior art.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), system management RAM (SMRAM), one or more processing resources such as a central processing unit (CPU) or hardware or software control logic, ROM, and/or other types of nonvolatile memory. Additional components of the information handling system may include a storage management initiative standard interface (SMI), one or more disk drives, one or more network ports for communication with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Figure 2:
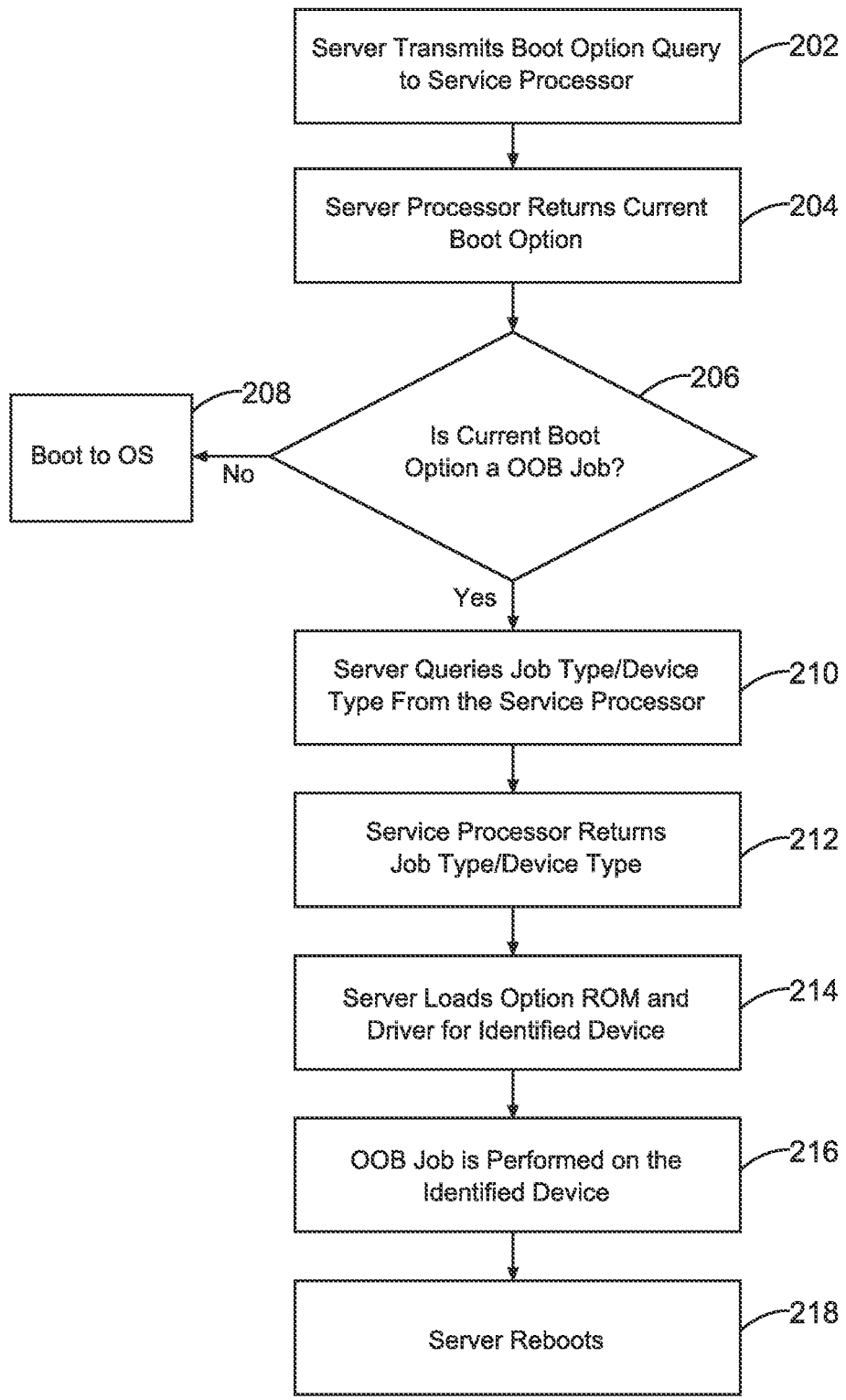
FIG. 2 depicts a process for performing an OOB job in accordance with an illustrative embodiment of the present disclosure.

Referring to FIG. 2, communication process between a host (e.g., an information handling system such as a server) and a service processor of a data processing network is depicted. First, at step 202, the host (e.g., an information handling system such as a server) may transmit a query boot option to the service processor. The service processor may include a number of boot options including, but not limited to, booting to the Operating System, running OOB jobs, loading pre-boot utilities (e.g., system inventory collection or system management applications), et cetera.

At step 204, the service processor returns a current boot option to the host. At step 206, the host determines if the current boot option is an OOB job. If not, the host proceeds to step 208 and collects system inventory before booting to the Operating System.

If the current boot option is an OOB job, at step 210 the host queries the service processor for the job type and/or device type associated with the OOB job. The associated job type and the associated device type refer to the job type and device type that will actually be utilized to perform the particular OOB job identified. The job type may include, but is not limited to, updating firmware, configuring a device, or a combination thereof Further, the device type may include a BIOS, a NIC, storage controllers, service processor, etc.

In response to the query from the host, the service processor identifies the associated job type and the associated device type for the particular OOB job. Specifically, the service processor may return the job type and device type to the server at step 212. The device which is scheduled for the OOB job may be identified by a unique identifier such as, for example, a Fully Qualified Device Descriptor ("FQDD") by the service processor.

Next, at step 214, the host selectively loads the Option ROM(s) and driver(s) for the particular device type(s) identified by the service processor at step 212. Specifically, the server may publish a service to map a platform device (e.g., LAN on Motherboard ("LOM") or PCIe slot) to this unique identifier. Based on this information provided by the service processor, the host can identify and selectively load the Option ROMs and drivers for the particular device identified by the service processor. For instance, if an OOB job is scheduled for a NIC, the server can forego loading the Option ROMs and drivers of all but that particular component, thereby reducing the time it takes to boot up the machine. The OOB job is then performed at step 216 and the server is rebooted at step 218, terminating the process.

Accordingly, as shown in FIG. 2, in accordance with an implementation of the present disclosure, once the host gets enough information from the service processor about the device to be configured and the job to be executed, it can selectively skip the option ROMs and drivers for the devices that are not participating in the specific job being executed on that boot.

For instance, if a CNA (Converged Network Adapter) configuration job is scheduled, then only drivers and Option ROMs related to that CNA device are loaded, not the drivers and ROMs related to any other components. Once the OOB job at hand is completed, all Option ROMs and drivers may be loaded on subsequent boots to aid in inventory collection.

In instances when multiple OOB jobs are scheduled, the host and the service processor may work together to determine the best possible configuration of required drivers and Option ROMs. This selected combination may then be loaded by the server. By selectively only loading the Option ROMs and drivers required for a particular OOB job, the methods and systems disclosed herein improve operational efficiency and minimize problems associated with unstable functionality of information handling components that are not required to perform the OOB job.

In accordance with certain implementations, the methods disclosed herein are performed by an information handling system having machine readable instructions that are stored in a computer readable medium.

Although the present disclosure has been described in detail, it should be understood that various changes, substitutions, and alterations can be made hereto without departing from the spirit and the scope of the invention as defined by the appended claims.

What is claimed is:

1. A method of performing an out of band (OOB) job at a host comprising:
  transmitting a boot option query from the host to a service processor;
  determining if a current boot option is an OOB job;
  identifying at least one of a job type and a device type associated with the OOB job if the current boot option is an OOB job, wherein the job type and the device type are utilized to perform the OOB job;
  identifying a device for performing the OOB job based, at least in part, on the job type and the device type, wherein a unique identifier is associated with the device;
  selectively loading an Option ROM and a driver relating to the identified job type and the identified device type; and
  performing the OOB job.

2. The method of claim 1, wherein the host is a server.

3. The method of claim 1, wherein the OOB job is selected from a group consisting of configuring a system device and updating firmware.

4. The method of claim 3, wherein the system device is selected from a group consisting of a Network Interface Card, a Redundant Array of Independent Disks, and a Basic Input/Output System.

5. The method of claim 1, wherein the OOB job is scheduled by one of a user and an executable script.

6. The method of claim 1, further comprising:
  determining a configuration of one or more drivers and one or more ROM options when a plurality of OOB jobs are scheduled, wherein the configuration is determined by the host and the service processor working together.

7. The method of claim 1, further comprising:
  publishing a service to map the device to the unique identifier.

8. The method of claim 1, further comprising:
  loading, upon completion of the OOB job and on a subsequent boot, all available Option ROMs and available drivers for inventory collection.

9. A data processing network system comprising a service processor and a host,
  wherein the service processor identifies an out of band (OOB job as a current boot option for the host, wherein the job type and the device type are utilized to perform the OOB job;
  wherein the host comprises a plurality of ROM options and a plurality of drivers, each of the plurality of ROM options and the plurality of drivers corresponding to a job type and a device type associated with an OOB job;
  wherein the service processor identifies a device for performing the OOB job based, at least in part, on the job type and the device type, wherein a unique identifier is associated with the device; and
  wherein the OOB client selectively loads one or more of the plurality of ROM options and the plurality of drivers depending on the OOB job identified by the service processor.

10. The data processing network system of claim 9, wherein the host is a server.

11. The data processing network system of claim 9, wherein the OOB job is selected from a group consisting of configuring a system device and updating firmware.

12. The data processing network system of claim 11, wherein the system device is selected from a group consisting of a Network Interface Card, a Redundant Array of Independent Disks, and a Basic Input/Output System.

13. The data processing network system of claim 9, wherein the OOB job is scheduled by one of a user and an executable script.

14. An information handling system having a non-transitory computer readable medium with machine readable instructions to:
  transmit a boot option query from a host to a service processor;
  determine if a current boot option is an out of band (OOB) job;
  identify at least one of a job type and a device type associated with the OOB job if the current boot option is an OOB job, wherein the job type and the device type are utilized to perform the OOB job;
  identifying a device for performing the OOB job based, at least in part, on the job type and the device type, wherein a unique identifier is associated with the device;
  selectively load an Option ROM and a driver relating to the identified job type and the identified device type; and
  perform the OOB job.

15. The information handling system of claim 14, wherein the host is a server.

16. The information handling system of claim 14, wherein the OOB job is selected from a group consisting of configuring a system device and updating firmware.

17. The information handling system of claim 16, wherein the system device is selected from a group consisting of a Network Interface Card, a Redundant Array of Independent Disks, and a Basic Input/Output System.

18. The information handling system of claim 14, wherein the OOB job is scheduled by one of a user and an executable script.

19. The information handling system of claim 14 wherein the machine readable instructions further:
  publish a service to map the device to the unique identifier.

20. The information handling system of claim 14, wherein upon completion of the OOB job all available Option ROMs and available drivers are loaded on a subsequent boot for inventory collection.

* * * * *